United States Patent
Murata

(10) Patent No.: US 9,482,527 B2
(45) Date of Patent: Nov. 1, 2016

(54) GEAR INSPECTION APPARATUS

(71) Applicant: Musashi Seimitsu Industry Co., Ltd., Toyohashi-shi, Aichi (JP)

(72) Inventor: Sota Murata, Toyohashi (JP)

(73) Assignee: MUSASHI SEIMITSU INDUSTRY CO., LTD., Toyohashi-Shi (JP)

( * ) Notice: Subject to any disclaimer, the term of this patent is extended or adjusted under 35 U.S.C. 154(b) by 158 days.

(21) Appl. No.: 14/324,344

(22) Filed: Jul. 7, 2014

(65) Prior Publication Data
US 2015/0013449 A1    Jan. 15, 2015

(30) Foreign Application Priority Data

Jul. 9, 2013   (JP) .................................. 2013-143836

(51) Int. Cl.
*G01M 13/02* (2006.01)
*G01B 21/20* (2006.01)
*G01B 11/14* (2006.01)
*G01B 11/24* (2006.01)

(52) U.S. Cl.
CPC .............. *G01B 21/20* (2013.01); *G01B 11/14* (2013.01); *G01B 11/2416* (2013.01); *G01M 13/021* (2013.01)

(58) Field of Classification Search
None
See application file for complete search history.

(56) References Cited

U.S. PATENT DOCUMENTS

| 5,271,271 | A  | * | 12/1993 | Frazier ................ | G01M 13/021 33/501.13 |
| 5,373,735 | A  | * | 12/1994 | Gutman .............. | G01M 13/021 33/501.07 |
| 7,748,131 | B2 | * | 7/2010 | Finkenwirth ....... | B23F 23/1218 33/501.13 |
| 2008/0028847 | A1 | * | 2/2008 | Baruchello ......... | G01M 13/021 73/162 |
| 2015/0192496 | A1 | * | 7/2015 | Do ...................... | G01M 13/021 73/162 |

FOREIGN PATENT DOCUMENTS

| JP | 56103344 | A | * | 8/1981 |
| JP | 57010401 | A | * | 1/1982 |

* cited by examiner

*Primary Examiner* — Andre Allen
(74) *Attorney, Agent, or Firm* — Rankin, Hill & Clark LLP

(57) ABSTRACT

A gear inspection apparatus includes a distance measurement device, a value search part, a difference calculation part, a selecting part, a judgment value determination part, and a judgment part that are connected together in the named order. A raw waveform obtained by the distance measurement device is converted by the value search part into a rectangular waveform of maximum value and a rectangular waveform of minimum value for each prescribed number of gear teeth, and a difference between the maximum value and the minimum value is calculated by the difference calculation part. The difference is converted into a nick determination value by the judgment value determination part, and the presence or absence of a nick is determined by the judgment part.

7 Claims, 14 Drawing Sheets

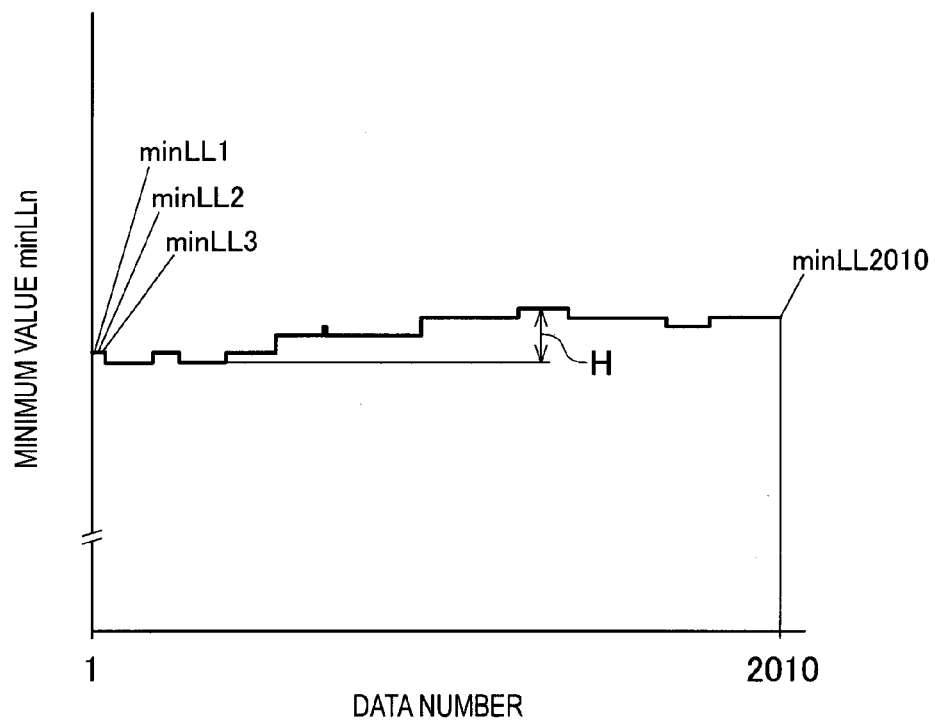

GEAR INSPECTION APPARATUS

FIELD OF THE INVENTION

The present invention relates generally to a gear inspection apparatus and, more particularly, to a double-flank composite gear inspection apparatus.

BACKGROUND OF THE INVENTION

As shown in FIG. 20 hereof, a gear 100 is a machine element having a plurality (ten in the illustrated embodiment) of teeth 101 at equal pitches. Pitch circle 102 is a main dimensional reference of the gear 100, and tooth thickness T is defined as a thickness of the tooth 101 measured at the pitch circle diameter. Tooth groove is defined as a groove between each pair of adjacent teeth 101, and the width W of the tooth groove is also one of main dimensions of the gear 100.

FIG. 21 hereof is an enlarged view of a part 21 shown in FIG. 20. As shown in FIG. 21, the gear 100 may occasionally have a dent or nick 103 on a surface of a tooth 101 thereof. The nick 103 is produced due to, for example, collision with another gear during transportation, or abutment with a jig or a tool during manufacture.

When the tooth 101 is subject to a local impact, a pit or recess is formed in a tooth surface while, at the same time, a peripheral edge of the recess rises from the tooth surface. Thus, the nick 103 is constituted by a recess 104 and a projection 105 along a peripheral edge of the recess 104. A problem will occur when the height of the projection 105 exceeds a predetermined level.

For instance, when the gear 100 having the nick 103 is used in combination with a mating gear (not shown), a large noise (abnormal noise) will occur because tooth flanks of the mating gear come into point contact with the projection 105 of the nicked gear 100, rather than surface contact which is normally established when the gear 100 has a smooth tooth flank 106 (indicated by phantom line shown in FIG. 21). To deal with this problem, the nicked tooth is burnished to remove the projection 105. Before taking such countermeasure for noise, it is necessary to perform an inspection to determine the presence or absence of a nick 103 on the gear tooth.

Over ball diameter (OBD) and runout are known as gear precision evaluation factors. As shown in FIG. 22, the OBD is defined as a dimension D measured over the outside of two balls 107 and 108 that are inserted in diametrically opposite tooth grooves of the gear 100 (for even number teeth gears, and as close as possible for odd number teeth gears). For gear teeth formed by machining, the width of the gear tooth groove becomes large as the cutting depth increases. This will allow the balls 107, 108 to move deeper in the tooth grooves, and a measured OBD becomes small. By contrast, a measured OBD becomes large as the cutting depth is reduced.

When a deviation of the measured OBD from a prescribed reference OBD value is within an allowable range, the test gear is judged as "acceptable". By contrast, when the deviation is outside the allowable range, the test gear is judged as "unacceptable".

It may occur that a gear is acceptable in terms of the OBD inspection but the middle point Dc of the measured ODB deviates from the center of rotation of the gear by a distance δ. The same phenomenon may also occur when the center of an axis of the gear is offset from the center of the pitch circle 102. These deviations are collectively called "runout".

In practice, the aforementioned OBD and runout are defined as shown in TABLE 1 below.

TABLE 1

| Name | Basic Data | Definition |
|---|---|---|
| OBD | A plurality of OBD measurement values obtained from a test gear | The average value of the OBD measurement values is given as the OBD |
| Runout | A plurality of OBD measurement values obtained from a test gear | The difference between a maximum value and a minimum value among the measured OBD values is given as the runout |

In the case where the nick inspection, the OBD inspection, and the runout inspection are performed separately and independently, inspection man-hour is greatly increased. To deal with this problem, a gear inspection apparatus using a master gear has been proposed as disclosed, for example, in Japanese Patent Application Laid-open Publication (JP-A) No. 10-300409.

In the disclosed gear inspection apparatus, a master gear of known precision is advanced toward until it comes into meshing engagement with a test gear which is rotatably supported at a fixed position. In this instance, zero-backlash, double-flank contact (i.e., on both left and right flanks) is established between the test gear and the master gear. The gear inspection apparatus of this type is called "double-flank composite gear inspection apparatus". The master gear is rotated to turn the test gear more than one complete revolution and, during that time, an amount of displacement of the master gear is measured by a noncontact sensor.

The double-flank composite gear inspection apparatus disclosed in JP 10-300409A includes a frequency filter provided to eliminate a swell in the waveform before a nick inspection is performed. In this instance, because the magnitude of a nick component waveform varies with the capacity of the frequency filter used, it is necessary to select an optimum frequency filter that can eliminate the swell from the waveform within a required and sufficient range. However, selection of such optimum frequency filter is difficult to achieve and requires an increased number of man-hours.

Furthermore, it is desirable for the OBD inspection and the runout inspection to suppress the effect of a nick component waveform as much as possible. This is because such a gear, which has a nick but is acceptable in terms of the OBD and runout, can be restored into a normal acceptable gear by removing the nick with a file, for example. This means that the OBD inspection and the runout inspection require a frequency filter which can eliminate the nick component waveform and hence is different from a frequency filter used in the nick inspection. This leads to a further increase in the inspection man-hours.

SUMMARY OF THE INVENTION

It is, therefore, an object of the present invention to provide a gear inspection apparatus which is capable of maintaining a desired degree of inspection reliability without using a frequency filter.

According to the present invention, there is provided a gear inspection apparatus for performing an inspection of a test gear while the test gear and a master gear that are disposed in parallel with each other are rotated in a meshed state about respective axes, the apparatus comprising: a distance measurement means that measures a distance between the axis of the master gear and the axis of the test gear; a value search means that finds a maximum value and a minimum value for each prescribed number of gear teeth about the measured distance between the respective axes of the master gear and the test gear; a difference calculating means that calculates a difference between the maximum value and the minimum value found for the each prescribed number of gear teeth; a judgment value determination means that specifies at least one difference of a plurality of differences calculated by the difference calculating means as an error estimation value of the test gear and determines a nick determination value by subtracting the error estimation value from the difference calculated by the difference calculation means for each prescribed number of gear tooth; and a judgment means that determines the presence or absence of a nick based on the nick determination value.

With the gear inspection apparatus thus arranged, a waveform (raw waveform) obtained by the distance measurement device is converted by the value search means into a rectangular waveform of maximum value and a rectangular waveform of minimum value for each prescribed number of gear teeth, and a difference between the maximum value and the minimum value is calculated by the difference calculation means. The calculated difference is converted into a nick determination value by the judgment value determination means, and the presence or absence of a nick is determined by the judgment means. With this arrangement, the effect of error components, such as surface roughness, noise and so on, can be suppressed and high inspection reliability can be maintained without requiring a frequency filter.

Furthermore, since the judgment value determination means subtracts an error estimation value from the difference calculated by the difference calculation means, the nick determination can be performed without being influenced by the effect of an error peculiar to each test gear.

Preferably, a minimum value of the plurality of differences calculated by the difference calculating means is specified as the error estimation value. The thus specified minimum value is considered to have a correlation with the magnitude of error components commonly contained in many teeth of the test gear. By specifying the minimum value as the error estimation value, the nick determination condition relative to a nick threshold value is made strict and inspection accuracy can be increased.

Preferably, a plurality of minimum values found by the value search means is used to determine an over ball diameter (OBD) of the test gear. With this arrangement, an OBD inspection can be performed during the time when the nick inspection is performed. Inspection man-hour and inspection cost can be reduced as compared to a case where the nick inspection and the OBD inspection are performed separately and independently. Furthermore, the minimum value does not contain a nick component and, hence, the OBD is not influenced by the presence or absence of a nick. The OBD inspection can thus be performed with increased reliability.

Preferably, a plurality of minimum values found by the value search means is used to determine a runout of the test gear. With this arrangement, a runout inspection can be performed during the time when the nick inspection is performed. Inspection man-hour and inspection cost can be considerably reduced as compared to a case where the nick inspection and the runout inspection are performed separately and independently. Furthermore, since the minimum value does not contain a nick component, a runout of the test gear is not influenced by the presence or absence of a nick. The runout inspection can be performed with enhanced reliability.

Preferably, the gear inspection apparatus further includes a selecting means that selects whether or not the error estimation value is to be subtracted from the difference. The selecting means enables the gear inspection apparatus to make a selection between a first process in which the error estimation value is used and a second process in which the error estimation value is not used. Usability of the gear inspection apparatus can thus be increased.

BRIEF DESCRIPTION OF THE DRAWINGS

A preferred structural embodiment of the present invention will be described in detail herein below, by way of example only, with reference to the accompanying sheets of drawings, in which:

FIG. 12 is a waveform chart showing the magnitude of a runout involved in the test gear;

DESCRIPTION OF THE PREFERRED EMBODIMENTS

Figure 1:
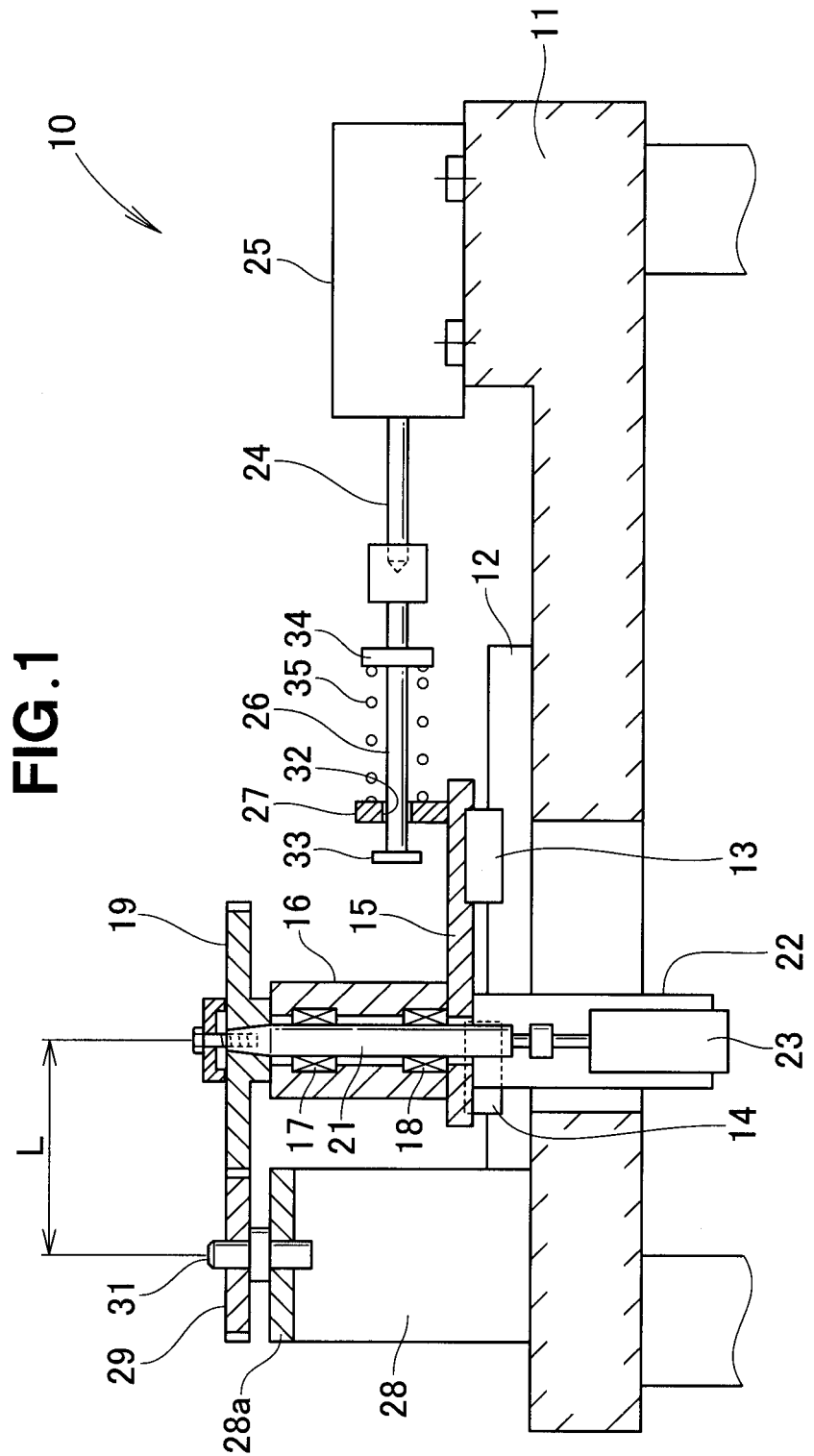
FIG. 1 is a schematic cross-sectional view of a gear inspection apparatus according to an embodiment of the present invention.
Figure 2:
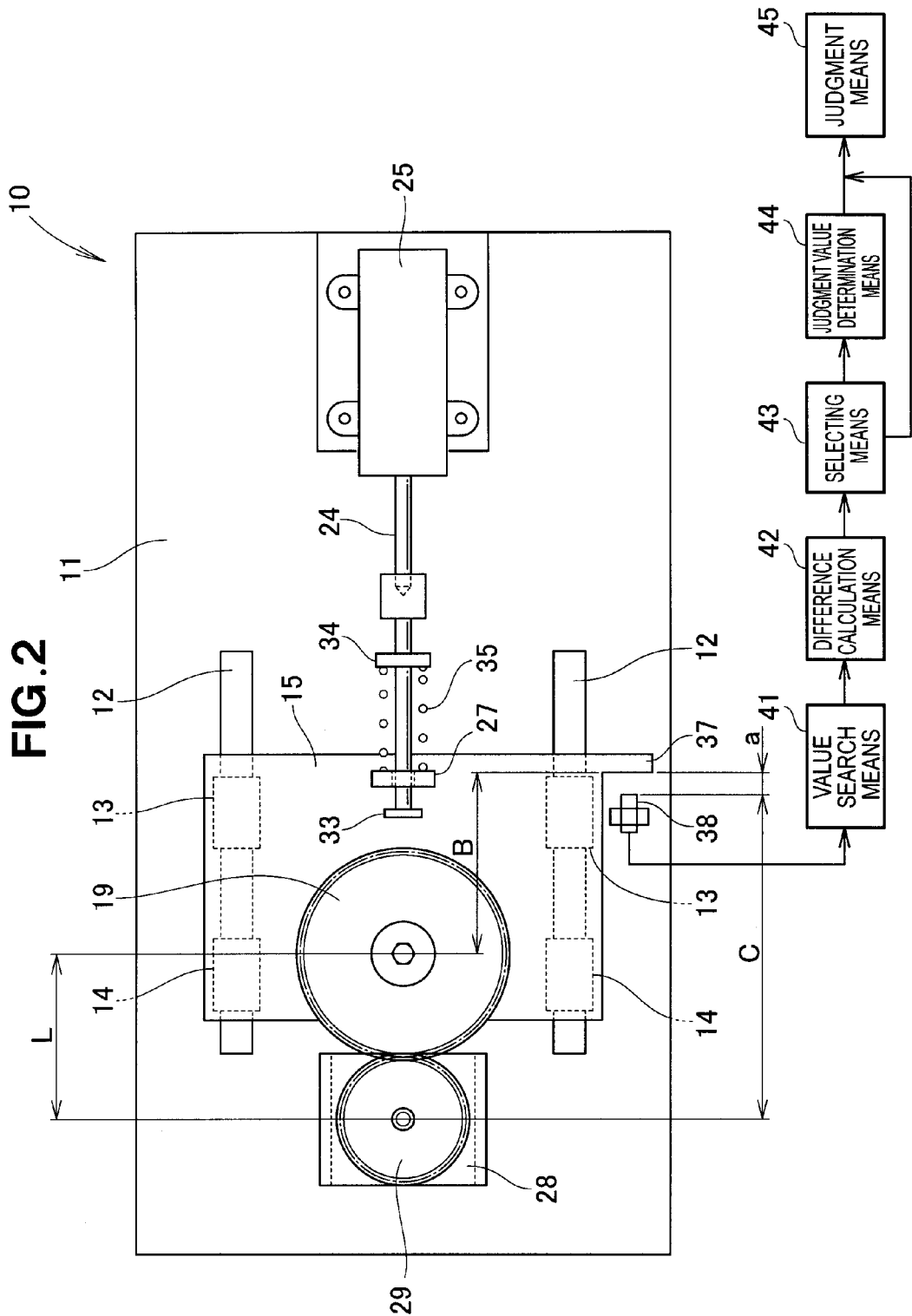
FIG. 2 is a plan view of the gear inspection apparatus.

Referring now to the drawings and FIG. 1 is particular, there is shown a gear inspection apparatus 10 according to an embodiment of the present invention. As shown in FIGS. 1 and 2, the gear inspection apparatus 10 generally comprises a base 11, a pair of parallel spaced rails 12, 12 mounted on the base 11, first and second sliders 13 and 14 slidably fitted with each of the rails 12, a horizontal carrier plate 15 extending crosswise between the rails 12 and fixedly supported by the first sliders 13 and the second sliders 14, a cylindrical sleeve 16 extending vertically upward from the carrier plate 15, a master gear support shaft 21 disposed vertically and rotatably mounted in the sleeve 16 via a pair of bearings 17, 18 for supporting a master gear 19, a bracket 22 extending vertically downward from the carrier plate 15, a master gear rotating means or device 23 mounted on the bracket 22 for rotating the master gear support shaft 21, a master gear displacing means or device 25 mounted on an end (right end in FIGS. 1 and 2) of the base 11 and having a piston rod 24 extending toward the sleeve 16, a rod 26 attached to a distal end of the piston rod 24 and extending toward the sleeve 16, an eye plate 27 operatively connecting the rod 26 to the carrier plate 15, a support block 28 of an inverted U-shaped configuration disposed upright on an opposite end (left end in FIGS. 1 and 2) of the base 11 and extending parallel to an axis of the sleeve 16, and a test gear support shaft 31 disposed vertically and rotatably mounted on a horizontal top wall 28a (FIG. 1) of the support block 28 for supporting a test gear 29.

The eye plate 27 is a plate having an eyelet or hole 32 formed therein. The rod 26 is a round rod having an outside diameter smaller than an inside diameter of the hole 32. The rod 26 has a flange-like stopper 33 at a distal end thereof and an annular flange-like spring retainer 34 at a proximal end portion thereof. A compression coil spring 35 is disposed between the spring retainer 34 and the eye plate 27.

The master gear rotating device 23 preferably comprises a servo motor, and the master gear displacing device 25 preferable comprises a serve cylinder actuator.

The test gear support shaft 31 rotatably supports thereon the test gear 29 but is fixed in position. The master gear support shaft 21 is rotatable by the master gear rotating device 23 while the master gear 19 is supported on the master gear support shaft 21 for rotation therewith. The sliders 13, 14 are slidably movable along the rails 12 so that the master gear support shaft 21 is movable along the rails 12.

The gear inspection apparatus 10 performs inspection while allowing replacement of the test gear 29 with a next subsequent test gear. When the test gear 29 is to be inspected, the spring retainer 34 is held in a predetermined position by the master gear displacing device 25. This will cause the spring 35 to force or press the eyelet plate 27 leftward in FIGS. 1 and 2. In this instance, because the eyelet plate 27 is firmly connected to the carrier plate 15 on which the master gear 19 is supported via the sleeve 16 and the master gear support shaft 21, the master gear 19 comes in mesh with the test gear 29 with a prescribed meshing force applied thereto.

Then, the master gear rotating device 23 is driven to rotate the master gear 19 about one complete evolution whereupon the test gear 29 is rotated one-and-a-half to two complete revolutions by the master gear 19. During that time, a center distance L (namely, a distance between the axis of the test gear 29 and the axis of the master gear 19) varies to a slight extent. The spring 35 is expandable and contractible and, hence, the center distance L is allowed to vary.

When the test gear 29 is to be replaced with another test gear, the master gear rotating device 23 is stopped, and the master gear displacing device 25 is operated to retract the piston rod 24. This will cause the stopper 33 to first come in contact with the eyelet plate 27 and then pull the carrier plate 15 toward the master gear displacing device 25. As a result, the master gear 19 is disengaged from the test gear 29. The test gear 29 is then removed from the test gear support shaft 31, and a next subsequent test gear is set on the test gear support shaft 31. Subsequently, the master gear displacing device 25 is operated to advance the piston rod 24 so that the spring retainer 34 assumes its prescribed position shown in FIGS. 1 and 2. Inspection for the next test gear will be executed in the same manner as described above.

Measurement for the center distance L will be discussed below with reference to FIG. 2. As shown in FIG. 2, the carrier plate 15 has a lateral projection 37 extending perpendicular to the rails 12, and a distance measurement means or device 38 is provided on the base 11. The distance measurement device 38 is configured to measure a distance "a" to the lateral projection 37 at all times. The distance measurement device 38 preferably comprises a noncontact photoelectric distance sensor having a light emitting element and a light receiving element incorporated therein and arranged to geometrically calculate the distance from a position receiving the reflected light. However, other types of distance sensors may be employed. Due to mutual meshing engagement between the master gear 19 and the test gear 29, the master gear 19 is caused to move toward and away from the test gear 29 which is fixed in position. With this movement, the distance "a" is varied.

The master gear 19 and the lateral projection 37 are provided on the carrier plate 15, a distance B from the center of the master gear 19 to the lateral projection 37 is constant. Similarly, the test gear 29 and the distance measurement device 38 are mounted on the base 11 and, hence, a distance C from the center of the test gear 29 to the distance measurement device 38 is constant. Thus, L+B=C+a, and L can be obtained from L=a+(C−B). Values of B and C are values already known and, hence, a variable L can be obtained by determining a variable "a" by the distance measurement device 38. The center distance L can thus be obtained.

A value search means or part 41, a difference calculation means or part 42, a selecting means or part 43, a judgment value determination means or part 44, and a judgment means or part 45 are connected together and disposed downstream of the distance measurement device 38 in the named order. Respective processing operations of these means or parts 41-45 will be discussed below in greater detail.

Figure 3:
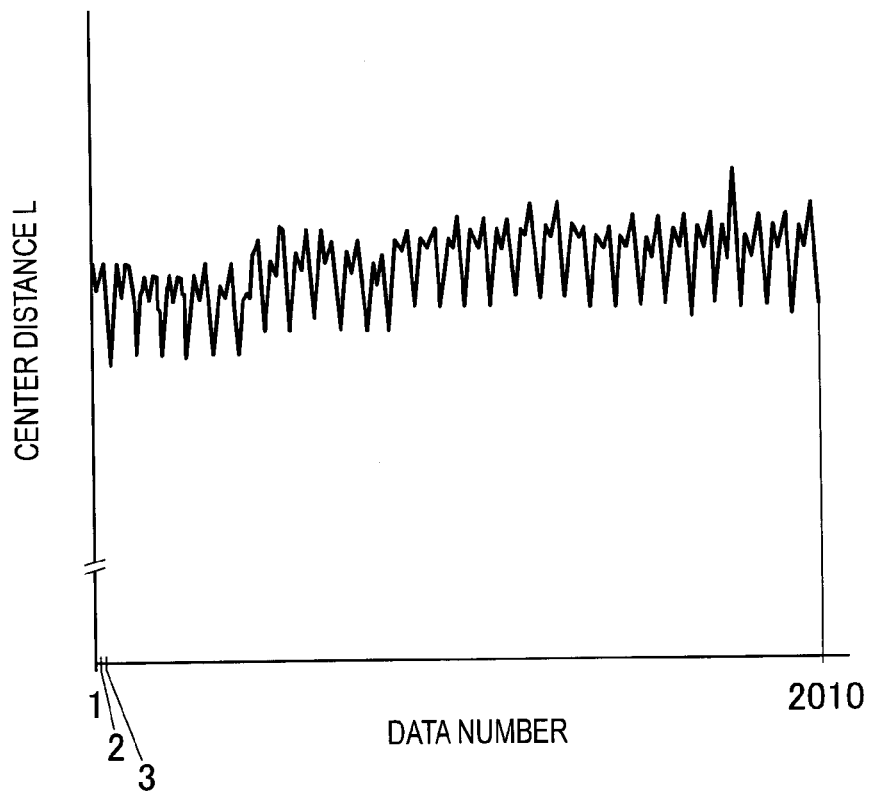
FIG. 3 is a waveform chart obtained when a test gear is measured for center distance.

FIG. 3 is a waveform chart showing measured values of center distance L obtained from a test gear 29 while in mesh with the master gear 19. The waveform shown in FIG. 3 contains data of thirty (30) teeth of the measured test gear 29. If sixty-seven (67) data are obtained for each gear tooth, a total number of data is 2010 (i.e., 30×67=2010) as indicated in the horizontal axis of FIG. 3. The horizontal axis scale begins from 1 and the data number increases one by one up to 2010.

The waveform shown in FIG. 3 is subjected to a maximum value finding (or extracting) process and a minimum value finding (or extracting) process that are described below in conjunction with TABLE 2 below.

TABLE 2

| DATA NUMBER | CENTER DISTANCE L | MINIMUM VALUE/MAXIMUM VALUE DETERMINATION |
|---|---|---|
| 1 | L1 | |
| 2 | L2 | |
| 3 | L3 | |
| . | . | max LL1 / min LL1 |
| . | . | max LL2 / min LL2 |
| . | . | max LL3 / min LL3 |
| 67 | L67 | |
| 68 | L68 | |
| 69 | L69 | |
| . | . | |
| 2010 | L2010 | |
| 1 | L1 | |
| 2 | L2 | |
| 3 | L3 | max LL2010 / min LL2010 |
| . | . | |
| 66 | L66 | |
| 67 | L67 | |
| . | . | |

Given that as to the center distance L, the data number 1 has a measured value L1, the data number 2 has a measured value L2, the data number 3 has a measured value L3, . . . , the data number 67 has a measured value L67, the data number 68 has a measured value L68, and the data number 69 has a measured value L69, and the data numbers 1 to 67 are treated as a single group, a maximum value and a minimum value are found or extracted from the group of measured values L1 to L67 and specified as max LL1 and minLL1, respectively.

Then, by shifting processing start data number by one, the data numbers 2 to 68 are treated as a single group and, a maximum value maxLL2 and a minimum value minLL2 are found or extracted from the group of measured values L2 to L68. Furthermore, the processing start data number is shifted by one so that the data numbers 3 to 69 are treated as a single group and, a maximum value and a minimum value are found or extracted from the group of measured values L3 to L69 and specified as maxLL3 and minLL3, respectively. A maximum value maxLLn and a minimum value minLLn for a group starting from the nth data number can thus be obtained (where n is 1, 2, 3 . . . 2010).

However, for those groups starting from the data number 1944 or greater (i.e., n=1944 to 2010), the number of data is insufficient and, accordingly, the measured values L1 to L66 for the group of the data numbers 1 to 66 are used again to supplement the data shortage. For instance, the data numbers 2010 to 66 are treated as a single group, and a maximum value maxLL2010 and a minimum value minLL2010 are found or extracted from the group of measured values L2010 to L66.

As an alternative, the test gear 29 may be rotated more than one complete revolution so that a total number of data is equal to 2076. In this case, the data numbers 2010 to 2076 are treated as a single group, and a maximum value maxLL2010 and a minimum value minLL2010 are found or extracted from the group of measured values L2010 to L2076. The maximum value maxLLn and the minimum value minLLn for the group starting from the nth data number can thus be obtained.

In the embodiment discussed above, sixty-seven (67) consecutive data pieces taken for each individual tooth are treated as a single group, however, one-hundred-thirty-four (134) consecutive data pieces taken for two adjacent teeth or two-hundred-one (201) consecutive data pieces taken for three adjacent teeth can be used as a single group. It is recommended that the number of teeth is selected according to the form of a waveform obtained by the measurement. The thus selected number of teeth is referred to as "prescribed number of teeth".

Figure 4:
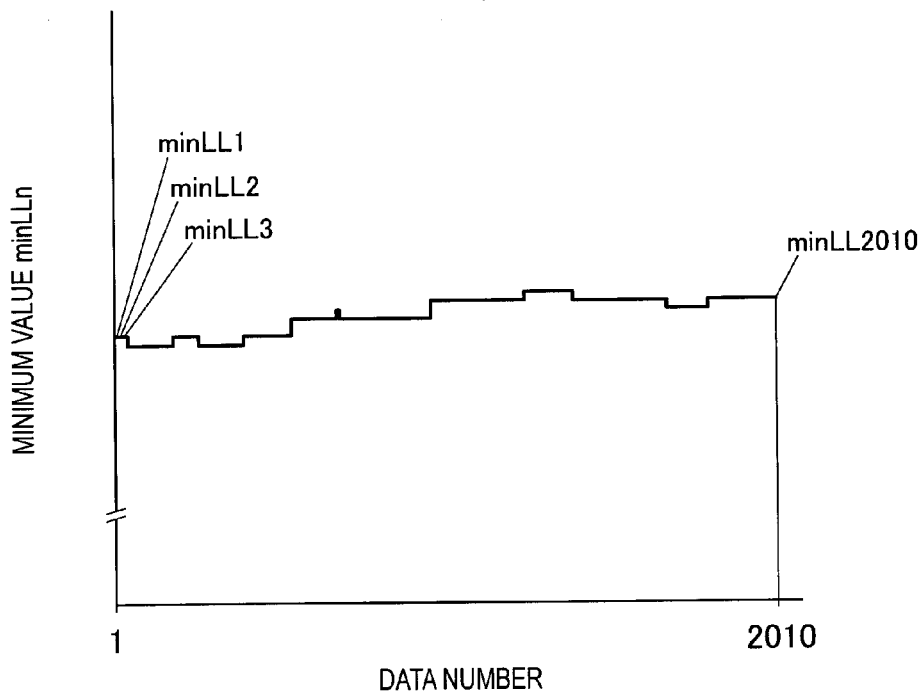
FIG. 4 is a rectangular waveform chart of minimum values obtained by a minimum value finding process performed on the waveform shown in FIG. 3.
Figure 5:
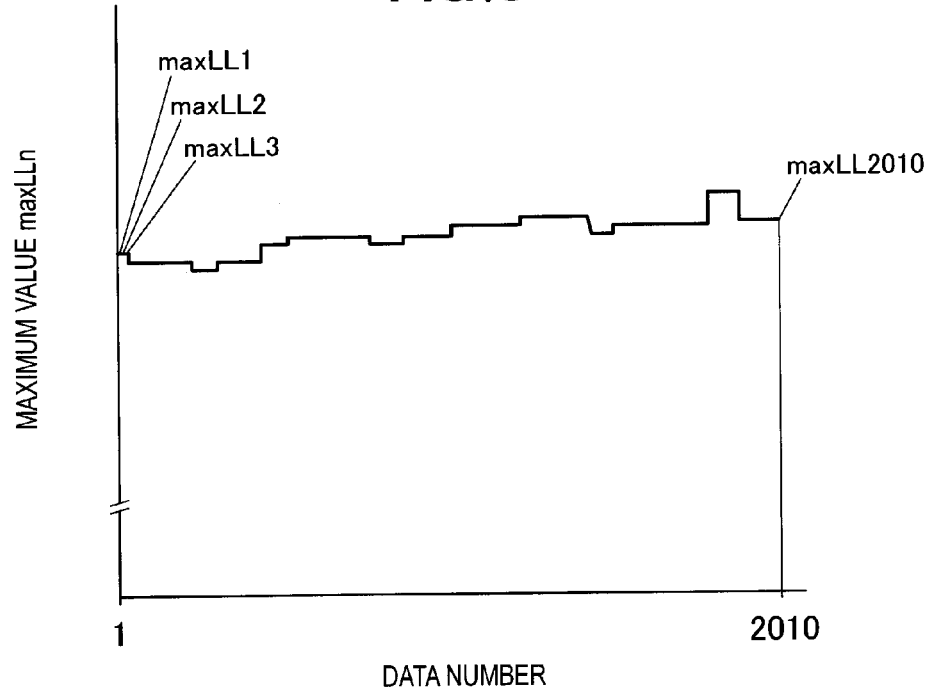
FIG. 5 is a rectangular waveform chart of maximum values obtained by a maximum value finding process performed on the waveform shown in FIG. 3.

FIG. 4 is a rectangular waveform chart obtained by connecting adjacent ones of the minimum values minLL1 to minLL2010. Similarly, FIG. 5 is a rectangular waveform chart obtained by connecting adjacent ones of the maximum values maxLL1 to maxLL2010. For convenience, the chart shown in FIG. 4 is called as a minLLn chart, while the chart shown in FIG. 5 is called as a maxLLn chart.

Figure 6:
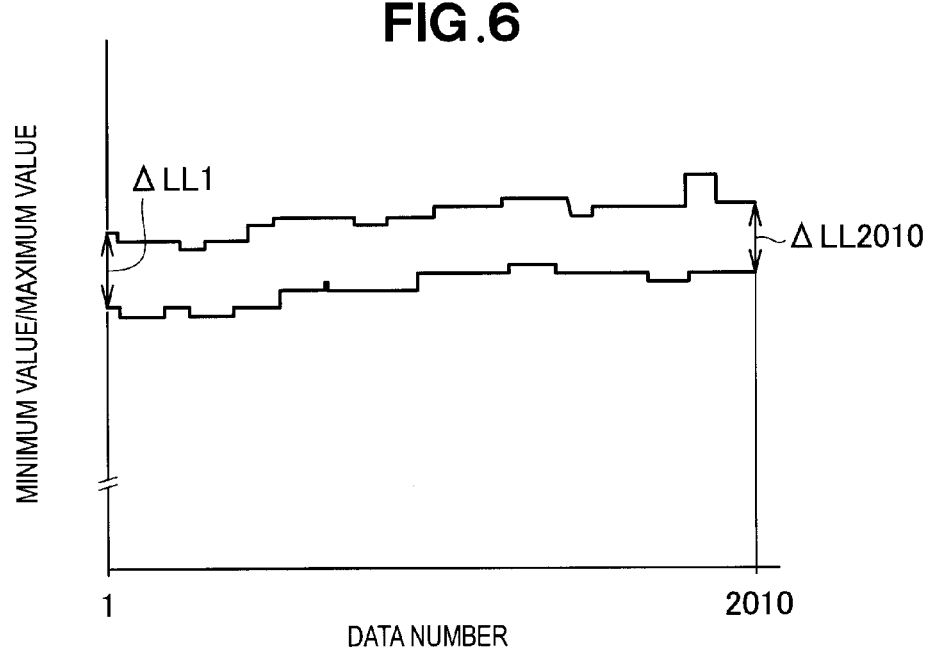
FIG. 6 is a waveform chart obtained by synthesizing the waveform charts shown in FIGS. 4 and 5.

By combining or synthesizing the minLLn chart shown in FIG. 4 and the maxLLn chart shown in FIG. 5, a chart shown in FIG. 6 is obtained. In FIG. 6, the difference between the maximum value maxLL1 and the minimum value minLL1 at scale 1 in the horizontal axis is represented by ΔLL1, and the difference between the maximum value maxLL2010 and the minimum value minLL2010 at scale 2010 in the horizontal axis is represented by ΔLL2010.

Figure 7:
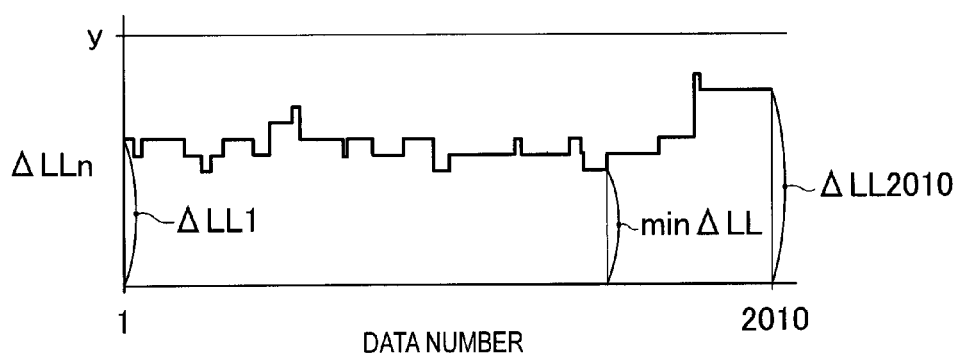
FIG. 7 is a waveform chart showing the difference between the maximum value and the minimum value shown in FIG. 6.

By connecting adjacent ones of the differences ΔLL1 to ΔLL2010, a chart shown in FIG. 7 is obtained. The chart shown in FIG. 7 is called for convenience as a ΔLLn chart. As shown in FIG. 7, the difference at scale 1 in the horizontal axis has a value ΔLL1 in the vertical axis, and the difference at scale 2010 in the horizontal axis has a value ΔLL2010 in the vertical axis. It is predictable that the larger the nick, the greater is the height of a rectangular waveform shown in FIG. 7.

The presence of a nick can be determined by comparing each individual difference (collectively designated by ΔLLn) with a nick threshold value "y". However, the rectangular waveform is varied in height depending on machining accuracy of the test gear 29. The machining accuracy and the nick are independent from each other, and it is desirable that those components originated from the machining accuracy are removed from the rectangular waveform.

Next, a way of removing the components or factors originated from machine accuracy will be described. A minimum value of the differences ΔLLn is given as minΔLL. The minΔLL corresponds to a surface roughness of each test gear 29. The machining accuracy of the gears is influenced by the cutting quality, wear and thermal deformation of a cutter, as well as the thermal deformation and vibration of a machining apparatus. The effect of these factors differs from each gear. It is therefore possible to consider that minΔLL is an error peculiar to each individual test gear (namely, an error estimating value).

The factors or components originating from the machining accuracy can be removed by subtracting the error estimated value minΔLL from each of the differences ΔLLn. The result is represented by a chart shown in FIG. 8. By comparing the height of a waveform shown in FIG. 8 with the nick threshold value "y", the presence or absence of a nick can be predicted. Such prediction requires as a prerequisite the determination of the nick threshold value "y". One example of the nick threshold value determination process will be discussed below.

Figure 9:
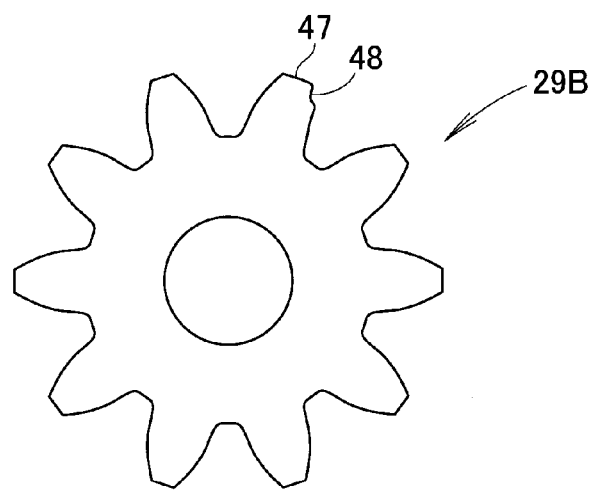
FIG. 9 is a front elevational view of a test gear having a nick on a tooth.

When a test gear 29B having a nick 48 as shown in FIG. 9 is rotated while keeping meshing engagement with a mating gear (not shown), an abnormal noise occurs periodically. It is apparent that the test gear 29B is an unacceptable gear having a nick 48 which requires a correction work. The test gear 29B is measured to determine a height of the nick 48 using a profile measuring instrument (not shown). A smaller value than a measured height of the nick 48 can be used as a nick threshold value "y". By thus setting the nick threshold value "y", it is possible to judge the test gear 29B as "unacceptable" because the height of the nick 48 (FIG. 9) measured by the profile measuring instrument exceeds the nick threshold value "y".

Figure 8:
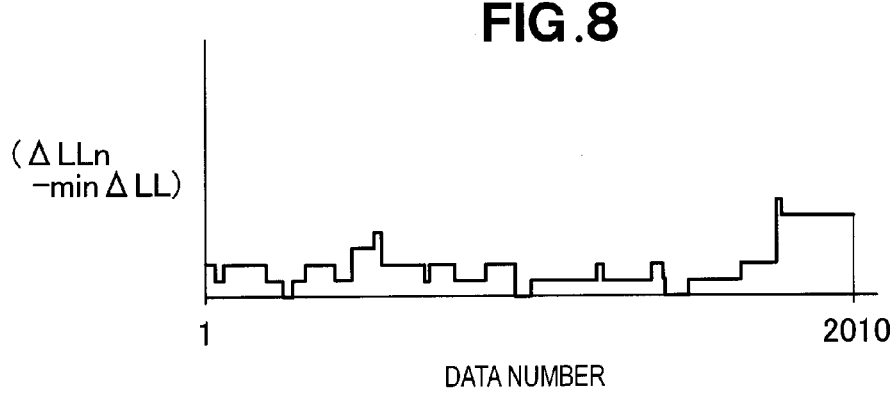
FIG. 8 is a waveform chart obtained by processing the waveform chart of FIG. 7.
Figure 10:
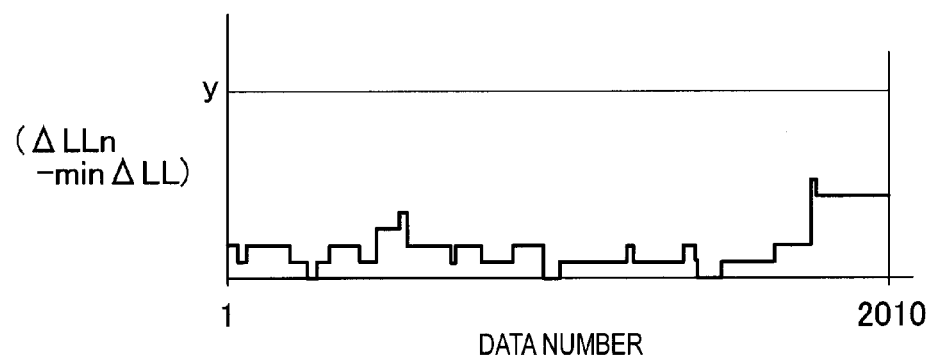
FIG. 10 is a chart illustrative of the manner in which the acceptance determination in terms of a nick is made on the test gear.

FIG. 10 is a chart identical to the chart shown in FIG. 8 with the exception that a straight line showing the nick threshold value "y" is added. In all of the regions, the waveform shown in FIG. 10 is below the nick threshold value "y" and the test gear 29 is judged as "acceptable". The test gear 29 is then removed from the gear inspection apparatus 10 shown in FIG. 2 and a next subsequent test gear is set on the gear inspection apparatus 10. Subsequently, center distance measurement is performed on the next test gear and a waveform similar to the one shown in FIG. 8 is obtained. The height of the waveform is compared with the nick threshold value "y" so that determination of the presence or absence of a nick can be achieved on the next test gear.

It may occur that a test gear has a nick on two or more teeth thereof. In this case, a waveform shown, for example, in FIG. 11 may be obtained. The presence of a plurality (two in the illustrated example) of nicks can be determined through a comparison of the height of the waveform with the nick threshold value "y" in the vertical axis of FIG. 10, and the location of the nicks can be specified through a search for the scales in the horizontal axis of the FIG. 11.

Next, a gear runout measuring method will be described. Referring back to FIG. 6, the runout is expected to appear as a swell in the waveform. However, if a nick is present on a tooth of the test gear, a swell in the waveform will become remarkable. This means that the presence of a nick exerts influence on the runout. However, the presence or absence of a nick is independent from the runout. It is evident from FIG. 6 that the waveform of minimum values does not contain factors or components resulting from the presence of a nick. A runout evaluation is therefore performed using only the minimum values.

FIG. 12 is a chart identical to the chart shown in FIG. 4. The magnitude of a swell in the waveform can be regarded as a runout. A maximum value and a minimum value are found from among the minimum values minLLn, and a maximum difference value H between the maximum and minimum values is determined as a runout of the test gear.

Figure 13A:
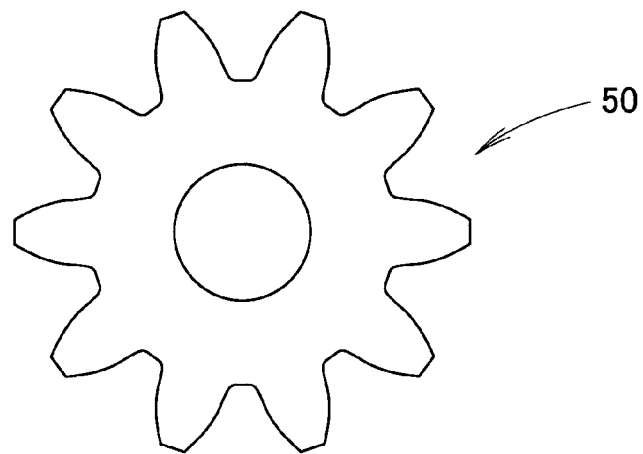
FIG. 13A is a front elevational view of a monitor gear.
Figure 13B:
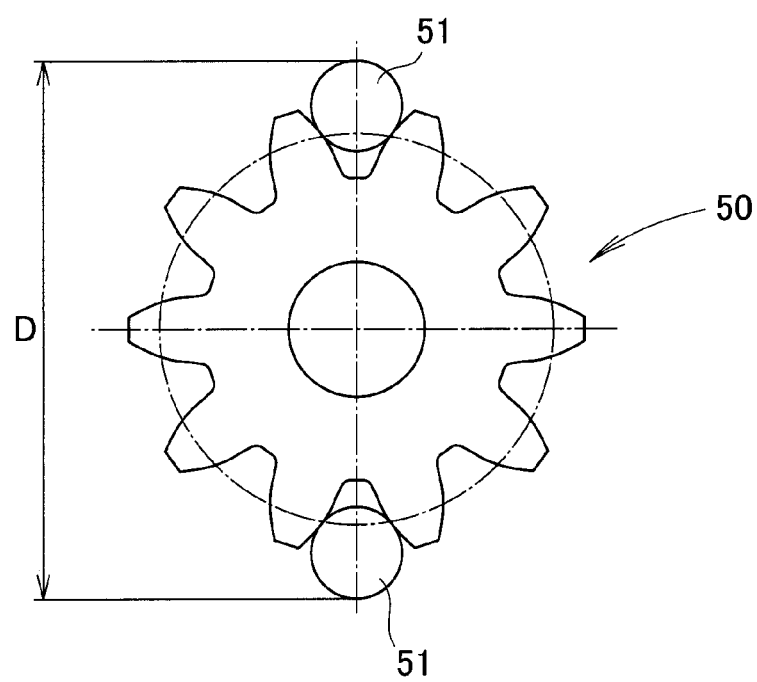
FIG. 13B is a front elevational view showing the monitor gear and balls received in diametrically opposite tooth spaces of the monitor gear.

Description will be next made of an over ball diameter (OBD) measuring method with reference to FIGS. 13A and 13B. As shown in FIG. 13A, a monitor gear 50 is provided. The monitor gear 50 is the same in configuration (module and pitch circle) as the test gear 29 (FIG. 2) but this gear 50 is a special gear as it has been finished with an accuracy extremely higher than that of the test gear 29.

As shown in FIG. 13B, two balls 51, 51 are inserted in diametrically opposite tooth grooves of the monitor gear 50, and a dimension D over the outside of the two balls 51 is measured. Preferably, the same measurement is repeated for several pairs of diametrically opposite tooth grooves at different locations and measured values are averaged. The average value thus obtained represents an OBD reference value.

Figure 14A:
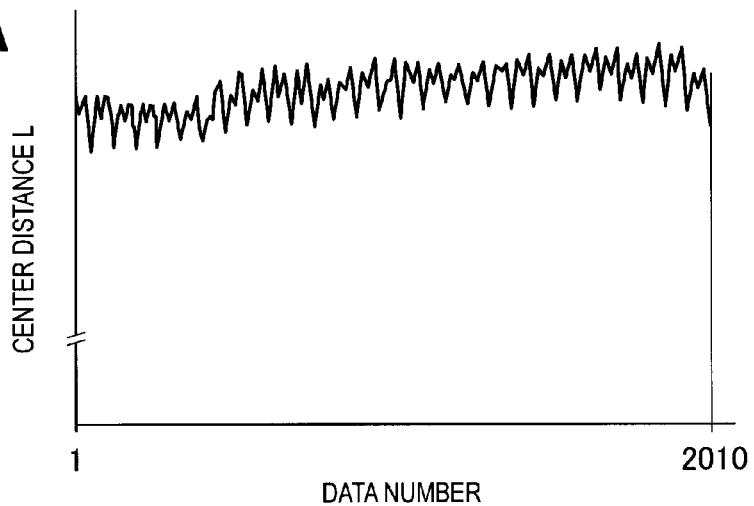
FIG. 14A is a waveform chart obtained when the monitor gear is measured for center distance.
Figure 14B:
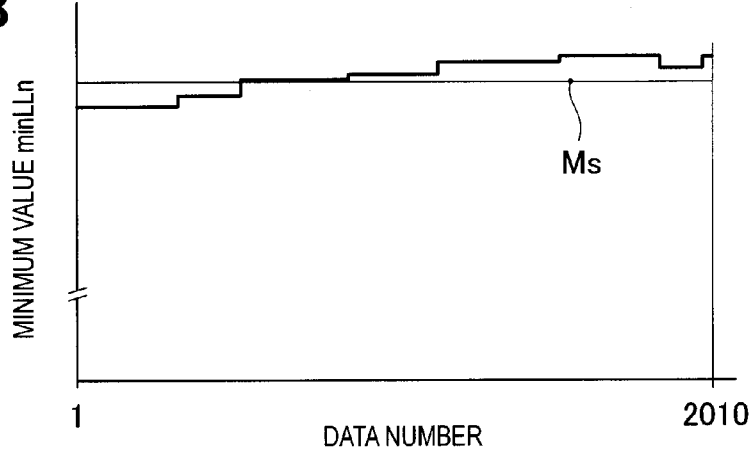
FIG. 14B is a rectangular waveform chart obtained from the waveform chart of FIG. 14A through a minimum value finding process.

The monitor gear 50 shown in FIG. 13A is then set on the gear inspection apparatus 10 and a measurement for the center distance L is performed with the result shown in FIG. 14A by way of a waveform chart. The waveform is subjected to the same process as that described with reference to FIG. 4, in order to determine a minimum value for each prescribed number of gear teeth. A rectangular waveform chart obtained by the minimum value finding (or extracting) process is shown in FIG. 14B, and an average value obtained from this rectangular waveform chart is specified as Ms.

Figure 14C:
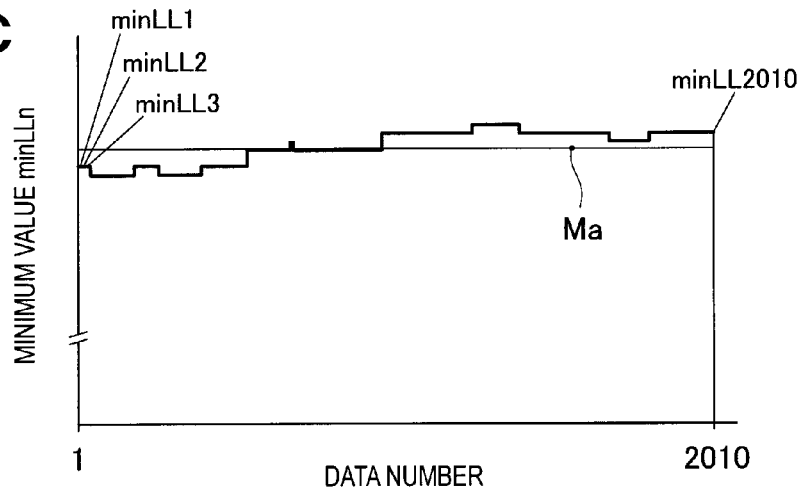
FIG. 14C is a rectangular waveform chart of minimum values obtained from the test gear.

FIG. 14C is a waveform chart identical that of FIG. 4 with the exception that an average value obtained from the waveform chart is denoted by Ma. The average value Ma shown in FIG. 14C is a value related to the test gear 29, while the average value Ms shown in FIG. 14B is a value related to the monitor gear 50. As already described with reference to FIG. 13B, the average value obtained in conjunction with the monitor gear is the OBD reference value.

An OBD of the test gear can be obtained from the expression: the OBD reference value+(Ma−Ms). Ma differs from each test gear, while the OBD reference value and Ms obtained in conjunction with the monitor gear 50 are constant and independent from Ma. This means that an OBD of any one of the test gear can be specified or determined by a variable Ma.

Figure 15:
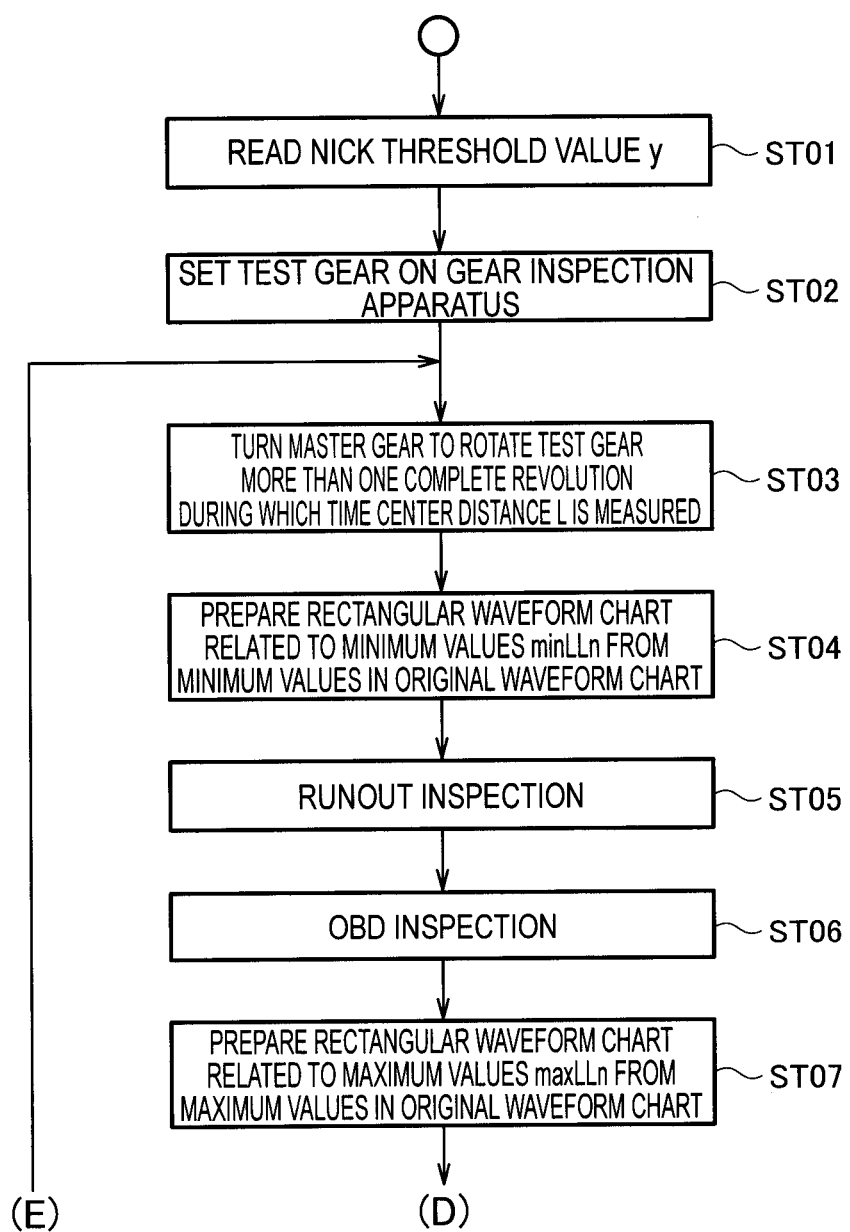
FIG. 15 is a flowchart showing a sequence of operations performed to achieve a first part of the nick inspection.

Inspection procedures executed by using the gear inspection apparatus 10 of the present invention will be described with reference to flowcharts shown in FIGS. 15 to 19. At first, as shown in FIG. 15, a step ST01 reads a nick threshold value "y" from a storage device (not shown). The nick threshold value "y" for each gear type is determined in advance in the manner as discussed above with reference to FIG. 9 and stored in the non-illustrated storage device.

At step ST01, a nick threshold value corresponding to the type of gears to be inspected is read out from the storage unit.

Then, one of the test gears 29 is set on the gear inspection apparatus 10 in such a manner as shown in FIG. 2 (step ST02), and the master gear 50 is turned to rotate the test gear 29 more than one complete revolution during which time center distance L is measured and measured values of the center distance L are stored in the non-illustrated storage device (step ST03).

Subsequently, from a waveform chart shown in FIG. 3 a rectangular waveform chart related to minimum values minLLn shown in FIG. 4 is prepared (step ST04). The waveform charts are employed for the purpose of facilitating easy understanding of the minimum value finding (or extracting) process. In place of the waveform chart, a data processing operation using numerical data can be employed.

Then, a runout inspection is performed (step ST005) followed by an OBD inspection (step ST06), and the procedure advances to a step ST07. The runout inspection and the OBD inspection will be explained below with reference to FIGS. 18 and 19, respectively. At step ST07, a rectangular waveform chart related to maximum values maxLLn shown in FIG. 5 is prepared from the waveform chart shown in FIG. 3.

Figure 16:
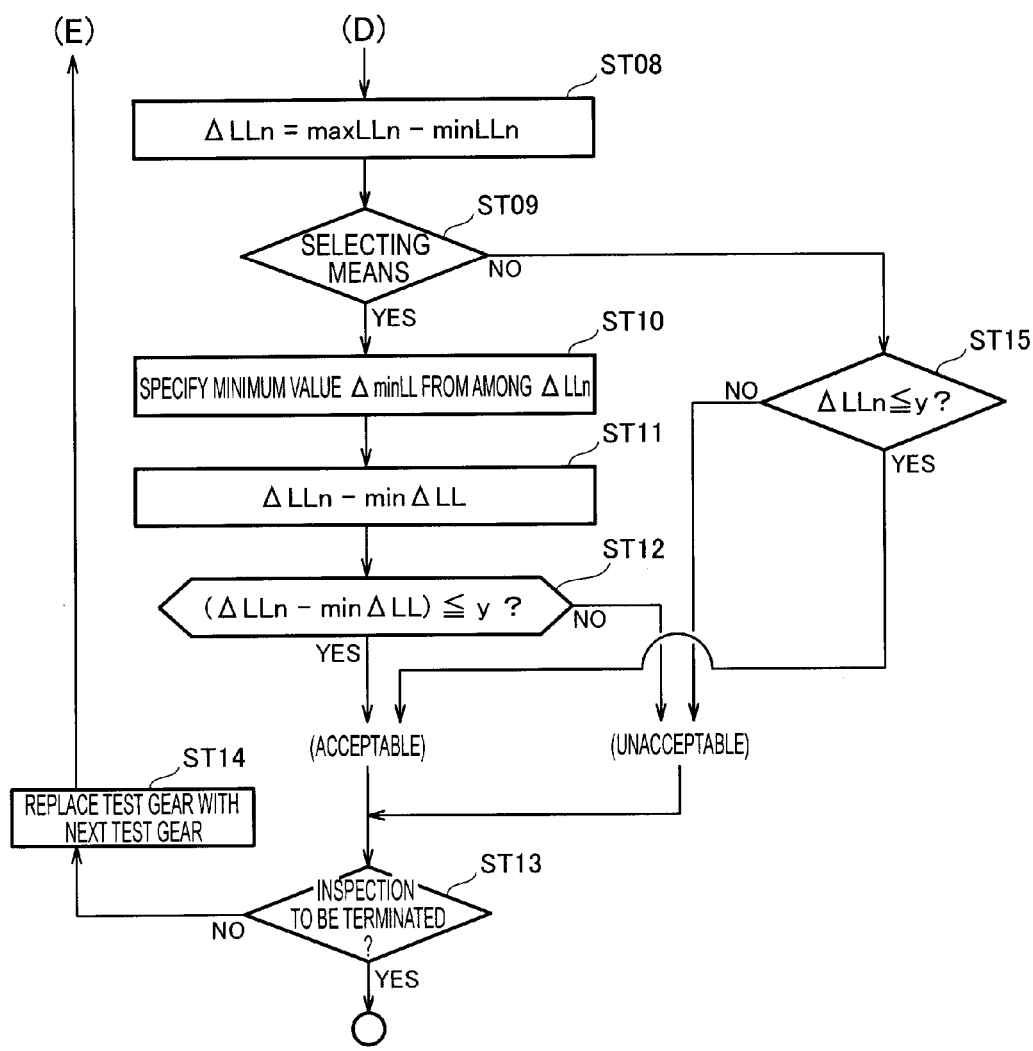
FIG. 16 is a flowchart showing a sequence of operations performed to achieve the nick inspection.

Subsequently, as shown in FIG. 16, the operation expression $\Delta LLn = maxLLn - minLLn$ is calculated (step ST08). Then, a step ST09 selects whether or not those factors or components originated from machining accuracy are to be removed. If the chosen result is affirmative (YES), this means that the factors or components originated from machining accuracy should be removed. In this case, a minimum value min$\Delta LL$ is specified from a group of values $\Delta LLn$ by, for example, making reference to FIG. 7 (step ST10). The thus specified min$\Delta LL$ corresponds to an error estimation value. Subsequently, the operation expression: $\Delta LLn - min\Delta LL$ is calculated at a step ST11. ($\Delta LLn - min\Delta LL$) represents a nick determination value. Subsequently, a step ST11 determines whether or not the nick determination value ($\Delta LLn - min\Delta LL$) is equal to or less than the nick threshold value "y". When an affirmative determination (YES) is made, the test gear 29 is judged as "acceptable" in terms of the nick inspection. Alternatively, when a negative determination (NO) is made, the test gear 29 is judged as "unacceptable" in terms of the nick inspection.

Step ST12 is followed by a step ST13 where a determination is made as to where or not the nick inspection is terminated. When the determination result is affirmative (YES), the nick inspection is terminated. Alternatively, when the determination result is negative (NO), the procedure goes to a step ST14 where the test gear 29 is replaced with a next test gear. The procedure then returns to step ST03 (FIG. 15) and the nick inspection is continued.

When the chosen result at step ST09 is negative (NO), the error estimation value min$\Delta LL$ is not subtracted from $\Delta LLn$ and $\Delta LLn$ is set to be a nick determination value (step ST15). As an internal processing operation performed by a computer, the error estimation value min$\Delta LL$ is set to zero (0), and a value obtained by subtracting zero (0) from $\Delta LLn$ is set to a nick determination value. For a gear type whose error estimation value min$\Delta LL$ is previously known as being extremely small as compared to $\Delta LLn$, $\Delta LLn$ can be used as a nick determination value. Furthermore, when $\Delta LLn$ is used as a nick determination value, the effects of a surface roughness variation and a noise caused due to machining accuracy in the pre-inspection processes can be taken into account when making a judgment at step ST15.

Figure 17:
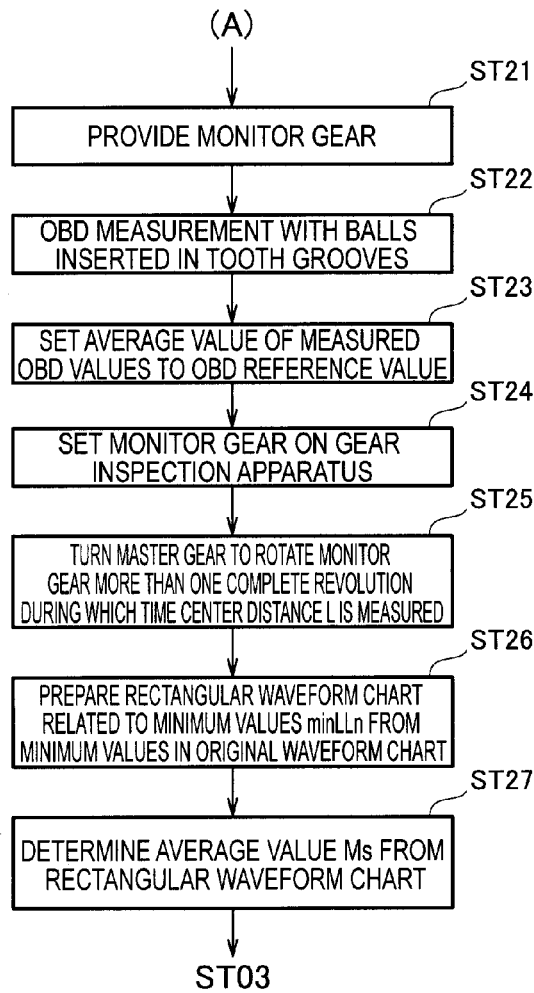
FIG. 17 is a flowchart showing a sequence of operation achieved to determine a runout of the monitor gear.

Referring next to FIG. 17, description will be made of a way of determining an OBD reference value and an average value Ms that are used for determination of an OBD variation or error of the test gear. The OBD reference value and the average value Ms are determined prior to actual execution of the OBD inspection. The thus determined values are associated with a corresponding one of various gear types and stored in the non-illustrated storage device. At first, a monitor gear such as the one 50 shown in FIG. 13A is provided (step ST21). Then, two balls are inserted in diametrically opposite tooth grooves of the monitor gear and an OBD measurement is performed while repeating the same procedure for several different pairs of tooth grooves (step ST22). Then, measured OBDs are averaged to determine an OBD reference value (step ST23).

Subsequently, the monitor gear is set on the gear inspection apparatus 10 (step ST24), and the master gear 19 is turned to rotate the monitor gear more than one complete revolution during which time a variation in the center distance L is measured (step ST25). From the raw waveform chart shown in FIG. 14A, a rectangular waveform chart related to minimum values minLLn shown in FIG. 14B is prepared (step ST26). From a rectangular waveform shown in FIG. 14B an average value Ms is determined (step ST27). Thus determined OBD reference value and average value Ms are associated with the corresponding gear type and stored in the non-illustrated storage device.

Figure 18:
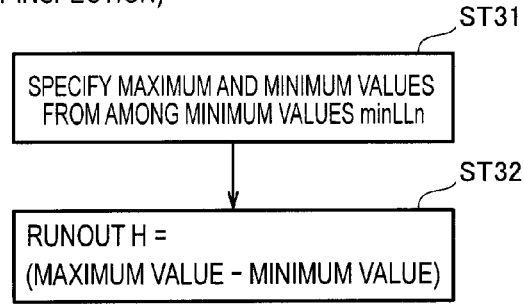
FIG. 18 is a flowchart showing a sequence of operations achieved to determine a runout of the test gear.

The runout inspection designated by step ST05 in FIG. 15 is performed according to a flowchart shown in FIG. 18. As shown in FIG. 18, a step ST31 specifies a maximum value and a minimum value from among a group of minimum values minLLn in the manner previously discussed with reference to FIG. 12. Subsequently, at a step ST32, the operation expression: the runout H=(the maximum value−the minimum value) is calculated to thereby determine a runout H of the test gear.

Figure 19:
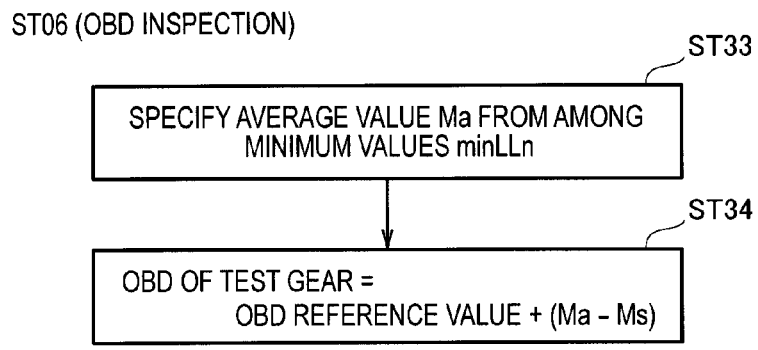
FIG. 19 is a flowchart showing a sequence of operations achieved to determine an OBD of the test gear.
Figure 20:
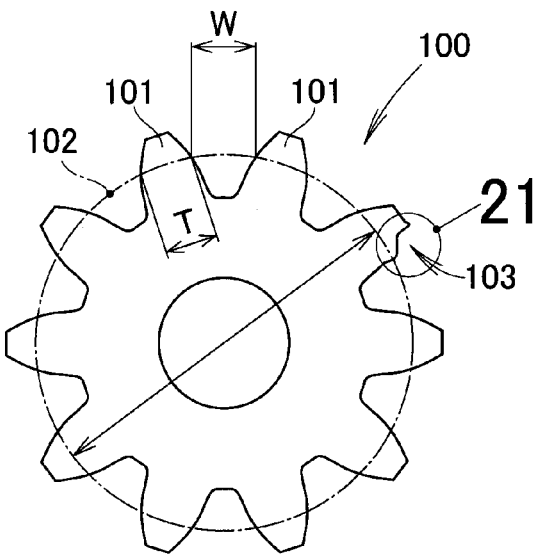
FIG. 20 is a front elevational view of a gear used for the purpose of explanation of deficiencies involved in a conventional gear inspection apparatus.
Figure 21:
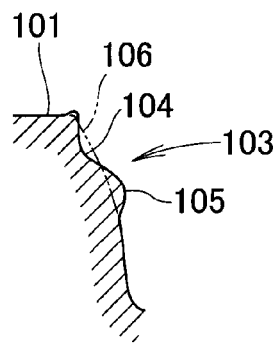
FIG. 21 is an enlarged view of a part 21 shown in FIG. 20.
Figure 22:
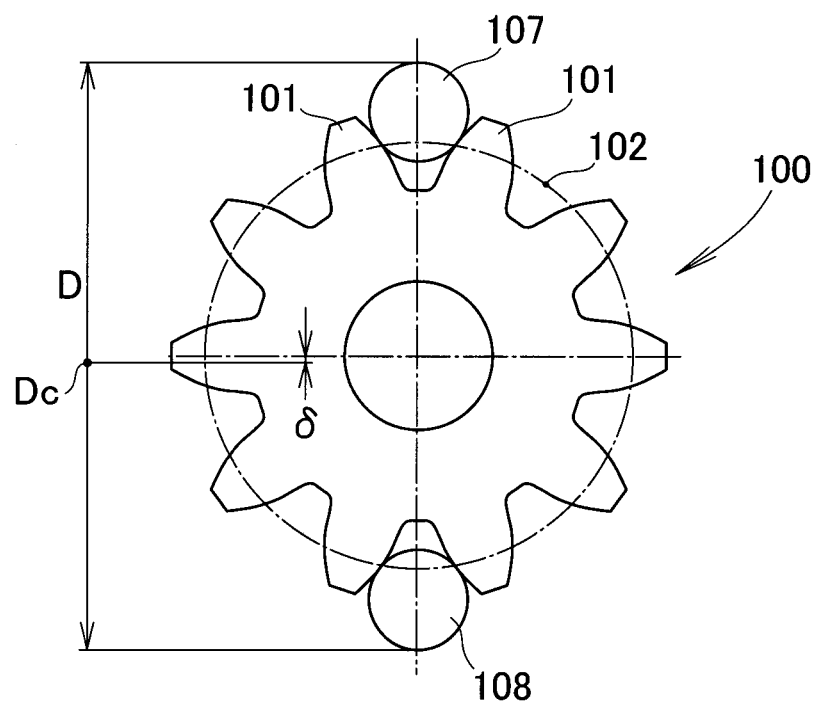
FIG. 22 is a view showing an over ball diameter measurement method.

The OBD inspection designated by step ST06 in FIG. 5 is performed according to a flowchart shown in FIG. 19. As shown in FIG. 19, a step ST33 specifies an average value Ma from among a group of minimum values minLLn in the manner as previously discussed with reference to FIG. 14C. Subsequently, at a step ST34, the operation expression: the OBD of the test gear=the OBD reference value+(Ma−Ms) is calculated to thereby determine an OBD of the test gear. The OBD reference value and the Ms value used in this calculation have already been determined respectively by step ST23 shown in FIG. 17 and step ST27 shown in FIG. 17. When the determined OBD or the determined runout is outside a prescribed range, the test gear is judged as "unacceptable" and the OBD inspection or the runout inspection is terminated. Alternatively when both the determined OBD and the determined runout are within the corresponding prescribed ranges, the procedure advances to step ST07 shown in FIG. 15 and the nick inspection is performed. It is preferable that the nick inspection is performed subsequent to the OBD inspection and the runout inspection. This is because a test gear which is judged as "unacceptable" only in terms of the nick inspection can be restored as a normal article by removing the nick through a proper repairing operation such as filing.

It will readily be appreciated from the embodiment discussed above that the present invention is directed to a gear inspection apparatus 10 for performing an inspection of a test gear 29 while the test gear 29 and a master gear 19 that are disposed in parallel with each other are rotated in a meshed state about respective axes, as shown in FIG. 1. As shown in FIG. 2, the gear inspection apparatus 10 includes a distance measurement means or device 38 that measures a distance L between the axis of the test gear 29 an the axis of the master gear 19.

The gear inspection apparatus 10 also includes a value search means or part 41 (FIG. 2) that finds a maximum value (FIG. 5) and a minimum value (FIG. 4) for each prescribed number of gear teeth (for each gear tooth, for example) about the measured distance between the respective axes of the master gear 19 and the test gear 29, in the manner as discussed above with reference to TABLE 2.

Figure 11:
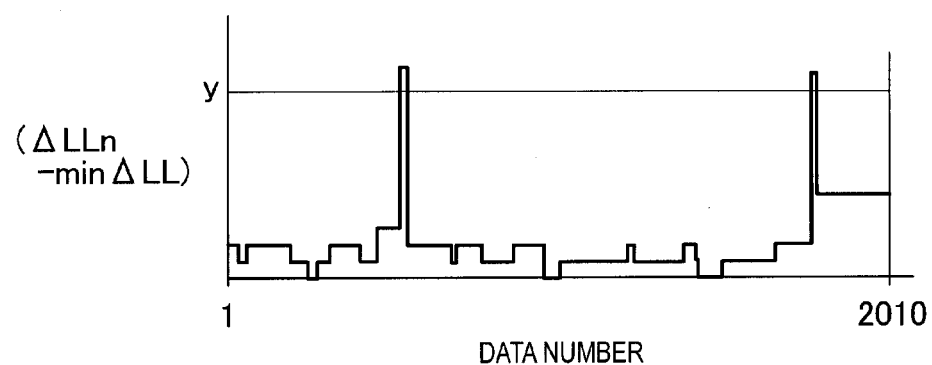
FIG. 11 is a chart illustrative of the manner in which the acceptance determination in terms of a nick is made on another test gear.

The gear inspection apparatus 10 further includes: a difference calculation means or part 42 (FIG. 2) that calculates a difference $\Delta LLn$ (FIG. 7) between the maximum value and the minimum value found for each prescribed number of gear teeth (for each gear tooth, for example); a judgment value determination means or part 44 (FIG. 2) that specifies at least one difference min$\Delta LL$ (FIG. 7) of a plurality of differences calculated by the difference calculation means 42 as an error estimation value of the test gear 29 and determines a nick determination value ($\Delta LLn - min\Delta LL$) (FIG. 8) by subtracting the error estimation value min$\Delta LL$ from the difference $\Delta LLn$ calculated by the difference calculation means 42 for each prescribed number of gear teeth; and a judgment means or part 45 (FIG. 2) that determines the presence or absence of a nick based on the nick determination value (ΔLLn−minΔLL), through comparison between the nick determination value (ΔLLn−minΔLL) and a nick threshold value "y", as shown in FIGS. 10 and 11.

The gear inspection apparatus 10 may further include a selecting means or part 43 (FIG. 2) that selects whether or not the error estimation value minΔLL is to be subtracted from the difference ΔLLn. The thus provided selecting means 43 enables selection between steps ST10-ST12 and step ST15, as shown in FIG. 16.

Obviously, various minor changes and modifications of the present invention are possible in light of the above teaching. It is therefore to be understood that within the scope of the appended claims the invention may be practiced otherwise than as specifically described.

What is claimed is:

1. A gear inspection apparatus for performing an inspection of a test gear while the test gear and a master gear that are disposed in parallel with each other are rotated in a meshed state about respective axes, the apparatus comprising:
   a distance measurement means that measures a distance between the axis of the master gear and the axis of the test gear;
   a value search means that finds a maximum value and a minimum value for each prescribed number of gear teeth about the measured distance between the respective axes of the master gear and the test gear;
   a difference calculating means that calculates a difference between the maximum value and the minimum value found for the each prescribed number of gear teeth;
   a judgment value determination means that specifies at least one difference of a plurality of differences calculated by the difference calculating means as an error estimation value of the test gear and determines a nick determination value by subtracting the error estimation value from the difference calculated by the difference calculation means for each prescribed number of gear tooth; and
   a judgment means that determines the presence or absence of a nick based on the nick determination value.

2. The gear inspection apparatus according to claim 1, wherein a minimum value of the plurality of differences calculated by the difference calculating means is specified as the error estimation value.

3. The gear inspection apparatus according to claim 1, wherein a plurality of minimum values found by the value search means is used to determine an over ball diameter of the test gear.

4. The gear inspection apparatus according to claim 2, wherein a plurality of minimum values found by the value search means is used to determine an over ball diameter of test gear.

5. The gear inspection apparatus according to claim 1, wherein a plurality of minimum values found by the value search means is used to determine a runout of the test gear.

6. The gear inspection apparatus according to claim 2, wherein a plurality of minimum values found by the value search means is used to determine a runout of the test gear.

7. The gear inspection apparatus according to claim 1, further comprising a selecting means that selects whether or not the error estimation value is to be subtracted from the difference.

* * * * *